United States Patent [19]
Deshich

[11] 3,774,833
[45] Nov. 27, 1973

[54] SHOCK ABSORBING FASTENING TOOL ASSEMBLY

[75] Inventor: Dushan Carl Deshich, Elmhurst, Ill.

[73] Assignee: Signode Corporation, Glenview, Ill.

[22] Filed: July 21, 1972

[21] Appl. No.: 273,959

[52] U.S. Cl.................. 227/156, 227/7, 227/100, 227/153
[51] Int. Cl............................................. B27F 7/02
[58] Field of Search .................. 227/7, 81, 99, 100, 227/101, 140, 152, 153, 156

[56] References Cited
UNITED STATES PATENTS

| | | | |
|---|---|---|---|
| 2,691,777 | 10/1954 | Casper | 227/7 |
| 2,755,470 | 7/1956 | Johnson | 227/101 |
| 3,261,527 | 7/1966 | Sterner | 227/7 |
| 3,436,004 | 4/1969 | Morabito et al. | 227/7 |
| 3,523,633 | 8/1970 | Wilson | 227/7 |

*Primary Examiner*—Granville Y. Custer, Jr.
*Attorney*—Max Dressler et al.

[57] ABSTRACT

A shock absorbing mount for a fastening tool such as a pneumatic nailer which is especially useful in applications where a plurality of pneumatic fastening tools are used simultaneously. Each tool is mounted on elastomeric diaphragm members for limited resilient shock absorbing movement in a direction parallel to the stroke of the driver blade of the fastening tool and for limited resilient rocking movement forwardly and rearwardly of the driving end of the driver blade. Each fastening tool is separately secured to a frame assembly.

14 Claims, 6 Drawing Figures

PATENTED NOV 27 1973 3,774,833
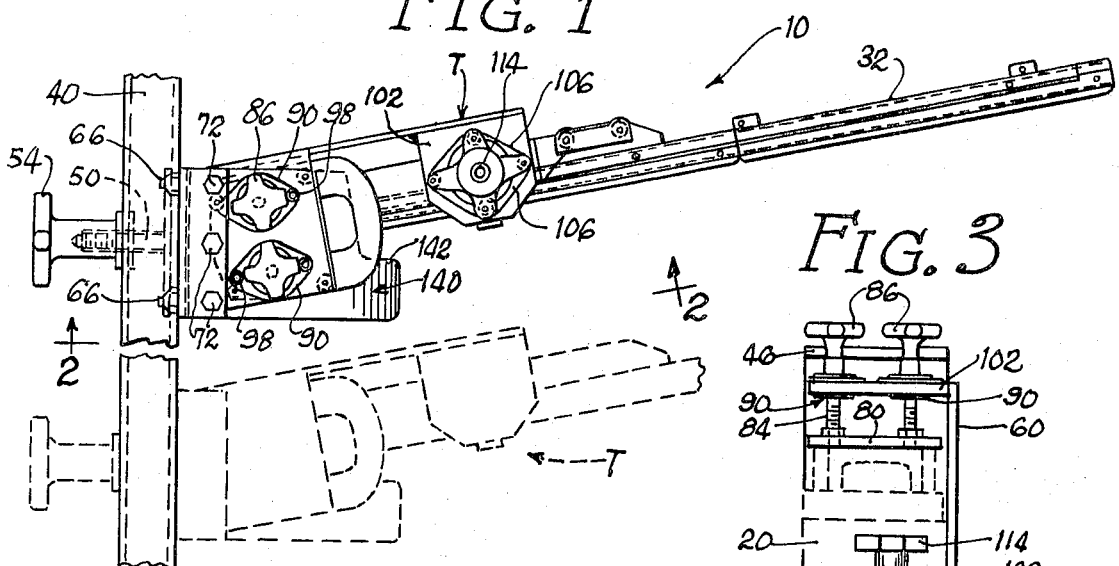
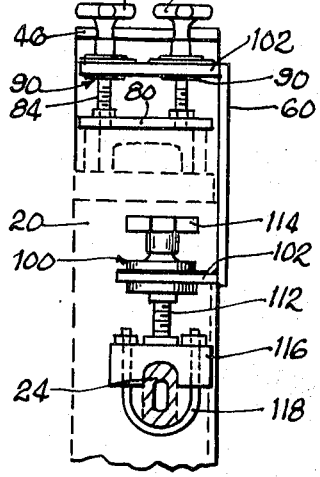
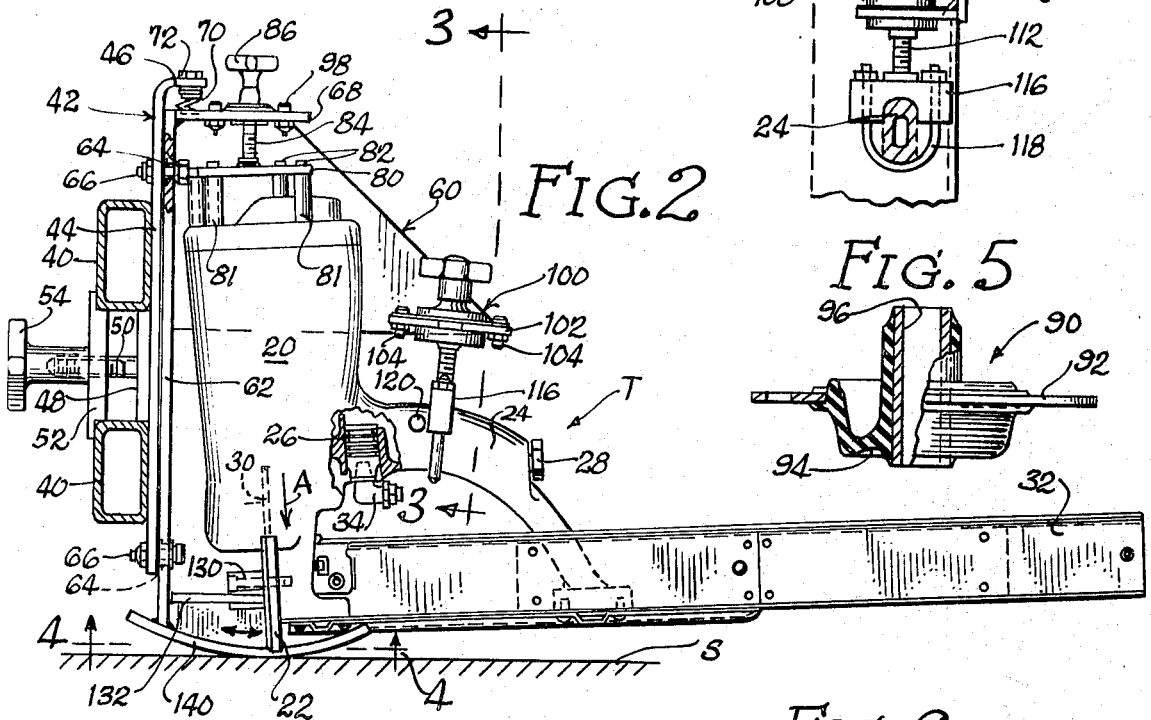
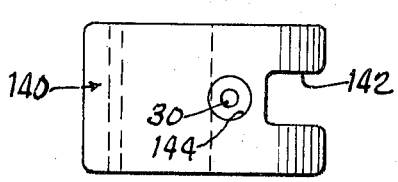
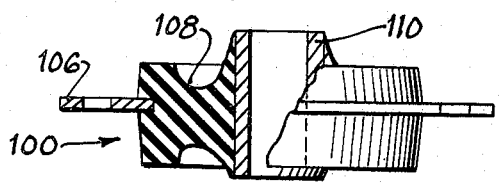

SHOCK ABSORBING FASTENING TOOL ASSEMBLY

This invention relates to a shock absorbing fastening tool assembly in which one or more power-operated fastening tools or guns for driving staples, nails or other fasteners into a workpiece are provided with means for preventing the transmittal of shock loads and vibrations to the tools and mounting assembly.

There are many environments in which it is desirable to mount power-operated fastening tools, such as pneumatic staplers and nailers, for driving fasteners into a workpiece thereby to secure two or more workpiece members to each other. When such tools are fixedly mounted on a frame assembly, the reaction forces resulting from the triggering of the tools causes severe vibrations and tends to so shake and shock the assembly that it tends to self-destruct, i.e., tends to shake the tool loose, tends to shatter frame assembly components and even tends to destroy the guns themselves.

Efforts have previously been made to alleviate the self-destructing characteristics of fixedly mounted fastening tools. One such effort has resulted in the mounting of tools for vertical reciprocation with respect to a beam or other frame member securing them. In such applications the tools, upon firing, tend to jump vertically away from the workpiece, to slide relatively to the mount, and to return to their downward positions after the recoil energy has been expended. Such arrangements have not been entirely satisfactory and the problem of providing an efficient and effective shock absorbing mount for power-operated fastening tools has remained.

Although it is highly desirable to provide a shock absorbing mount for any application in which a fastening tool is to be fixedly mounted on a frame assembly, it is of special importance where a plurality of fastening tools are to be used simultaneously. For example, where wallboard is to be attached to a wooden framework to provide factory-manufactured prefabricated building walls, it is necessary from a practical standpoint simultaneously to utilize and fire eight, ten, twelve and even more fastening tools at adjacent locations. A typical prior art gang mount assembly is illustrated by FIG. 2 of Sterner U.S. Pat. No. 3,261,527. Another type of multiple fastening tool mount is illustrated in U.S. Offenwanger Pat. No. 3,628,714. Unless suitable shock absorbing means are provided in such multiple tool applications, the tendency of such an assembly to self destruct is greatly magnified.

In accordance with this invention, a shock absorbing fastening tool assembly which absorbs and dissipates the high impact energy and shock loads developed during the firing of one or a plurality of fastening tools is provided. The shock absorbing tool assembly comprises a frame assembly including a frame member and a fastening tool mounting member, and means for releasably connecting these members. A fastening tool having a driver blade is resiliently mounted on the fastening tool mounting member for limited, resilient shock absorbing movement in a direction parallel to the stroke of the driver blade and for limited resilient rocking movement forwardly and rearwardly of the driving end of the driver blade. The resilient mounting means dissipates the shock loads and impact energy upon the firing of the fastening tool without transmitting those loads either to the fastening tool mounting member or to the frame member, or, for that matter, to the remainder of the frame assembly. The resilient mounting means eliminates the metal to metal contact of prior art mounting assemblies.

By providing for limited resilient rocking movement forwardly and rearwardly of the driving end of the driver blade, the driver blade action on the fastener is enhanced, particularly where the workpiece which is to receive the fastener and the fastening tool move relative to each other during the fastening operation. If the fastening tool is mounted on a movable carriage and the carriage is in continuous motion as it traverses the workpiece members, during the fraction of a second it takes to drive the fastener into the workpiece, the driver blade should be stationary relative to the fastener and the workpiece members. By providing for limited resilient rocking movement forwardly and rearwardly of the driving end of the driver blade, if, for example, the movable carriage is moving in a forward direction, then the tool may rock or move slightly rearwardly during the fastener driving operation. That slight rocking movement maintains contact between the driver blade and the driven fastener during the entire driving interval. Prior art recoil mounts, such as those of the reciprocating type, do not permit or provide for the maintenance of driving contact with the fastener during the entire driving interval.

Most desirably, the resilient mounting means for the fastening tool are elastomeric diaphragm components or members which are secured to the fastening tool mounting member and to the fastening tool at spaced locations, those locations preferably being spaced in a direction lengthwise of the fastening tool. One of the resilient mounting components is preferably substantially in line with the stroke or direction of reciprocation of the driver blade whereas another component is generally adjacent to the center of gravity of the tool to promote slight rocking movement about the center of gravity. The frame member is fixedly secured to the frame assembly, thereby to locate the fastening tool in a predetermined and fixed position with respect to the frame assembly. The fastening tool mounting member is slidably connected to the frame member for relative movement in a direction parallel to the stroke of the driver blade. The mounting member is preferably biased downwardly in the direction of the stroke of the driver blade to urge the fastening tool downwardly into engagement with the workpiece members, thereby to hold the workpiece members against each other during a fastening operation to improve the connection provided by the fastener.

The shock absorbing fastening tool assembly of this invention is especially adapted for a gang mount operation in which a plurality of fastening tools are intended to be used conjointly.

Other objects, features and advantages of this invention will become apparent from the following description and drawings, of which:

FIG. 1 is a plan view of a portion of a shock absorbing fastening tool assembly in accordance with this invention;

FIG. 2 is a side elevational view of a portion of the assembly of FIG. 1 taken substantially along the line 2—2 of FIG. 1;

FIG. 3 is a rear view taken substantially along the line 3—3 of FIG. 2;

FIG. 4 is a fragmentary bottom view taken substantially along the line 4—4 of FIG. 2; and FIGS. 5 and 6 are, respectively, partial cross-sectional views of shock absorbing mounting members of the assembly of FIG. 1.

Referring now to the drawings, a shock absorbing fastening tool assembly 10 of this invention comprises a suitable frame assembly for mounting one or more fastening tools and for locating those fastening tools properly with respect to a workpiece surface S. A desired number of power-operated fastening tools T for a particular application is provided. Tools T may be guns adapted to drive staples, nails or other fasteners, and may be operated by compressed air, by electric power, by inertia devices or by any other suitable means. However, in a presently preferred embodiment, the fastening tools T are illustrated as pneumatic nailing guns which are designed to be operated and fired by compressed air. Nailing tools T may be of any conventional type, such as those which include a housing 20, a nosepiece 22, a handle 24, a triggering valve 26 and a connection 28 for providing driving air for a driving piston (not shown) located in housing 20. The driving piston is appropriately connected to a driver blade 30 which is disposed in and guided by nosepiece 22, and which is positioned to drive a fastener from a magazine 32. Any triggering valve may be used to fire the tool T and a suitable remotely actuatable, air operable triggering valve is disclosed in Offenwanger U.S. Pat. No. 3,628,714.

When tool T is triggered, as by providing triggering air through fitting 34 to triggering valve 26, the piston causes the driver blade 30 to move in the direction of the arrow A in FIG. 2, to contact an underlying fastener which has been presented by the magazine 32 in known manner and to drive the fastener downwardly into workpiece surface S. The firing of the tool and the impact of the fastener against the surface S create substantial reaction forces and shock loads which ordinarily are transmitted to the mounting for the tools. However, in accordance with this invention, the mounting assembly for tools T is such that reaction forces, shock loads and vibrations are absorbed and dissipated rather than being transmitted to the mounting assembly.

The mounting assembly of this invention comprises a frame assembly, only a portion of which is illustrated in the drawings. The frame assembly includes a pair of frame or beam members 40 which are fixedly and rigidly supported in a predetermined position by the remainder of a support frame assembly not shown. Beam members 40 are positioned to be clampingly engaged by a tool mount frame member 42 which comprises a flat main plate 44, an upper flange 46, and a central enlargement 48. Enlargement 48 mounts a threaded stud 50 which passes through a clamping plate 52 and which mates with a threaded clamping knob 54. When clamping knob 54 is tightened (as illustrated by FIG. 2), the tool mount frame member 42 is releasably secured to beam members 40 at a predeterminable and desired location.

A fastening tool mounting member 60 is mounted on frame member 42 for limited vertical movement. Mounting member 60 includes a front flange 62 which lies parallel to flat main plate 44. Front flange 62 defines two pairs of vertical slots 64 which confront suitable openings in the flat main plate 44. Nut and bolt means 66 fixedly secured to flat main plate 44 provide shank portions disposed within the slots 64, thereby to permit limited vertical movement of front flange 62 with respect to flat main plate 44.

Mounting member 60 further includes an upper horizontal flange 68 which confronts upper flange 46. Upper flange 46 mounts three compression springs 70 which are secured by nut and bolts 72. Compression springs 70 resiliently bias the mounting member 60 downwardly toward surface S to urge a tool T against the workpiece surface S thereby to assist in holding the workpiece members against each other during a fastening operation.

A housing plate 80 is fixedly secured to the upper end of housing 20, as by a plurality of threaded screws 82 surrounded by spacer tubes 81. Housing plate 80 mounts a pair of studs 84, each of which extends upwardly through flange 68. At their uppermost ends, studs 84 threadedly mount adjusting knobs 86. A pair of resilient mount assemblies 90 are secured to horizontal flange 68 as by nuts and bolts 98. Each assembly 90 includes a metallic connector plate 92, an elastomeric or rubber diaphragm member 94 and a central sleeve or bushing 96 which is suitably bonded and secured to the diaphragm member so that as the diaphragm is flexed and moves the centrally located sleeve 96 moves with it. The central bore of sleeve 96 is proportioned to slidably receive a stud 84. Connector plate 92 is also suitably bonded to the diaphragm member 94.

Adjusting knobs 86 are screwed down so that the lower end of the adjusting knob suitably contacts the upper ends of sleeves 96 to appropriately adjust the elevation of the driver blade. Studs 84, hence the diaphragms 94, are approximately in line with the nosepiece 22, hence are approximately in line with the stroke of the driver blade 30, thereby to react substantially in line with the reaction forces resulting from the firing of the tool T.

Tool T is supported on the mounting member 60 by a further resilient mounting assembly 100. This mounting assembly is secured to a flange 102 of mounting member 60 by nuts and bolts 104 passing through suitable openings in a connector plate 106. The elastomeric or rubber diaphragm 108 of mounting assembly 100 centrally mounts a metallic sleeve bushing 110 through which a stud 112 passes upwardly. Diaphragm 108 is suitably bonded to connector plate 106 and to bushing 110.

The upper end of mounting stud 112 cooperates with a threaded adjustment knob 114 for appropriately elevating the tool T at the location of mounting assembly 100. Stud 112 extends upwardly from a yoke member 116 which is fixedly clamped to the tool handle 24 by a U-bolt 118.

Mounting assembly 100 is located closely adjacent the center of gravity 120 of tool T. As such, when the tool is fired it tends to recoil vertically with respect to the mounting assemblies 90 and 100 and, because the assemblies 90 and 100 are resilient and elastomeric, they will permit a slight rocking motion about the center of gravity.

It is to be noted that the diaphragms 94 of resilient mounting assemblies 90 are relatively thin, thereby readily to permit multiplanar movement, i.e., both relative vertical movement and some movement even in a direction parallel to the main surface of the diaphragm.

The relative thinness also permits canting of the bushing 96 out of a position generally normal to the diaphragm 94 without adversely affecting the diaphragm or its ability to absorb and dissipate the reaction forces. The diaphragm 108 of mounting assembly 100 is relatively thick. It will permit the central bushing 110 to rock about an axis normal to the diaphragm to provide for the action and advantages of that action referred to above and further will permit vertical movement with respect to the plane in which the connector plate 106 is located.

The nosepiece 22 of tool T mounts a snubber block 130, preferably of plastic, which is received within a yoke plate 132 to limit forward movement of the tool with respect to the front plate 62 which mounts the yoke plate, and further to limit and to prevent lateral movement of the nosepiece of the tool.

The lowermost end of mounting member 60 is provided with an arcuate pressure foot 140 which bears against workpiece S at a predetermined and preselected pressure which is controlled by compression spring 70 which bias the mounting member 60 downwardly relative to frame member 44. The arcuate shape of the pressure foot 140 permits the tools to move freely and to rock with respect to a workpiece S to prevent snagging of the tool on the workpiece and the like. Pressure foot 140 defines a slot 142 at its rearward edge into which, as necessary, magazine 32 may depend. An aperture 144 is provided generally centrally of the pressure foot 140. Aperture 144 underlies the nosepiece and is sufficiently generously sized so that the driver blade 30 may drive a fastener from the magazine 32 therethrough and so that the tool T may rock slightly with respect to mounting member 60 during a driving operation. Aperture 144 may be generally round because the fastening tool T illustrated is intended to drive nails, instead of, for example, staples. If staples are to be driven, then an appropriate pressure foot would define a long, narrow slot rather than a generally circular opening.

When a shock absorbing fastening tool assembly of this invention is to be used, a suitable plurality of tools T are mounted on individual mounting members 60 by properly spaced and located mounting assemblies 90 and 100. Mounting members 60 are then secured to frame members 42 and these assemblies are, in turn, clampingly secured as to beam members 40. When fasteners are to be driven, a source of driving air is provided for each of the tools and triggering air is provided to each triggering valve 26. As the tools fire, the shock and reaction forces are substantially entirely absorbed and dissipated by the diaphragms 94 and 108, thereby preventing the transmission of these forces to the remainder of the mounting assembly and substantially eliminating the tendency of the assembly to destroy itself. By so absorbing and dissipating the impact energy and shock loads, the noise level in the area in which the tools T are used is also dramatically reduced.

During the driving operation, the snubber block 130 and cooperating yoke 132 prevent lateral movement of the tool. When the tools and tool mounts are on a carriage continuously moving with respect to the workpiece surface (or the work is continuously moving with respect to the tools), the positioning of the rear mounting assembly 100 generally at the center of gravity 120, and the flexibility of the forwardly positioned diaphragms 94 will permit the tools to rock rearwardly slightly thereby to maintain the driver blade relatively stationary with respect to the driven fastener and with respect to the workpiece surface, thereby assuring proper and continuous contact between the driver blade and the fastener during the entire driving interval, assuring proper fastening.

It will be apparent from the foregoing that modifications may be made in the embodiments disclosed herein without departing from the spirit and scope of the invention. Accordingly, the scope of the invention is to be considered as limited only insofar as may be required by the claims.

I claim:

1. A shock absorbing fastening tool assembly including a frame assembly, the frame assembly comprising a frame member, a fastening tool mounting member, and means releasably connecting said frame and mounting members to each other, a fastening tool having a driver blade, and means resiliently mounting said fastening tool to said mounting member for limited resilient shock absorbing movement in a direction parallel to the stroke of the driver blade and for limited resilient rocking movement forwardly and rearwardly of the driving end of the driver blade.

2. A shock absorbing fastening tool assembly in accordance with claim 1 wherein said resilient mounting means comprises at least two elastomeric members secured to said fastening tool and to said fastening tool mounting member.

3. A shock absorbing fastening tool assembly in accordance with claim 2 wherein said elastomeric members are spaced from each other, one being positioned generally in line with the direction of the stroke of said driver blade.

4. A shock absorbing fastening tool assembly in accordance with claim 3, wherein said elastomeric members are diaphragm members.

5. A shock absorbing fastening tool assembly in accordance with claim 4 wherein said diaphragm members provide mounting means centrally thereof for securing said fastening tool to said fastening tool mounting member.

6. A shock absorbing fastening tool assembly in accordance with claim 1 wherein said fastening tool mounting member is slidably connected to said frame member for relative movement in a direction parallel to the stroke of the driver blade.

7. A shock absorbing fastening tool assembly in accordance with claim 6 wherein biasing means are interposed between said frame member and said mounting member to bias said fastening tool into engagement with a workpiece.

8. A shock absorbing fastening tool assembly in accordance with claim 6 wherein said frame assembly comprises a further frame member, and means for fixedly securing said frame member and said further frame member to each other thereby fixedly to mount said fastening tool relative to said frame assembly.

9. A shock absorbing fastening tool assembly in accordance with claim 1 wherein said fastening tool is a pneumatic fastening tool.

10. A shock absorbing fastening tool assembly in accordance with claim 1 wherein said resilient mounting means comprises at least two spaced apart components each secured to said mounting member and to said fastening tool, one of said resilient mounting components being secured to said tool closely adjacent its center of gravity and the other of said resilient mounting components being secured to said tool well forward of said center of gravity and generally in line with the direction of stroke of said driver blade.

11. A shock absorbing fastening tool assembly in accordance with claim 10 wherein the component in line with the driver blade comprises a pair of side by side elastomeric diaphragm members.

12. A shock absorbing fastening tool assembly in accordance with claim 10 wherein said fastening tool mounting member is slidably connected to said frame member for relative movement in a direction parallel to the stroke of the driver blade and wherein said fastening tool is a pneumatic fastening tool.

13. A shock absorbing fastening tool assembly in accordance with claim 12 wherein said components are elastomeric diaphragm members.

14. A shock absorbing fastening tool assembly in accordance with claim 1 wherein said frame assembly comprises a further frame member, and further comprising a plurality of first-mentioned frame members, a plurality of mounting members, and a plurality of fastening tools, each being resiliently mounted on a said mounting member, and means for fixedly securing each of said first frame members to said further frame member thereby to fixedly mount said plurality of fastening tools relative to said frame assembly.

* * * * *